United States Patent
Beukema et al.

(10) Patent No.: US 6,691,217 B2
(45) Date of Patent: Feb. 10, 2004

(54) METHOD AND APPARATUS FOR ASSOCIATING MEMORY WINDOWS WITH MEMORY REGIONS IN A DATA STORAGE SYSTEM

(75) Inventors: Bruce Leroy Beukema, Hayfield, MN (US); David F. Craddock, New Paltz, NY (US); Thomas Anthony Gregg, Highland, NY (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 09/864,116

(22) Filed: May 24, 2001

(65) Prior Publication Data

US 2002/0178339 A1 Nov. 28, 2002

(51) Int. Cl.[7] ................................................. G06F 12/00

(52) U.S. Cl. ...................... 711/170; 711/171; 711/172; 711/173; 711/203; 707/205; 707/206

(58) Field of Search ................................ 707/205, 206; 711/170–173, 203

(56) References Cited

U.S. PATENT DOCUMENTS

| | | | | |
|---|---|---|---|---|
| 5,687,370 A | * | 11/1997 | Garst et al. | 707/206 |
| 5,842,019 A | * | 11/1998 | Kolawa et al. | 717/130 |
| 6,026,415 A | * | 2/2000 | Garst et al. | 707/206 |
| 6,304,884 B1 | * | 10/2001 | Garst et al. | 707/206 |
| 6,339,818 B1 | * | 1/2002 | Olszewski et al. | 711/173 |

* cited by examiner

Primary Examiner—T. Nguyen
(74) Attorney, Agent, or Firm—Duke W. Yee; Mark E. McBurney; Lisa L. B. Yociss

(57) ABSTRACT

A method, program and system for associating memory windows with memory regions in an infiniband data storage system are provided. The invention comprises registering a Memory Region, wherein the Memory Region is a set of virtually contiguous memory addresses defined by a virtual address and length. The system then establishes and maintains a Window Reference Count (WRC) for the Memory Region, which tracks the number of Memory Windows which are bound to the Memory Region. When the system binds a Memory Window to the Memory Region, the value of the WRC is incremented. When a Memory Window is unbound from the Memory Region, the value of the WRC is decremented. If no Memory Windows are bound to the Memory Region, the value of the WRC is zero. The Memory Region is not deregistered unless the value of the WRC equals zero.

12 Claims, 4 Drawing Sheets

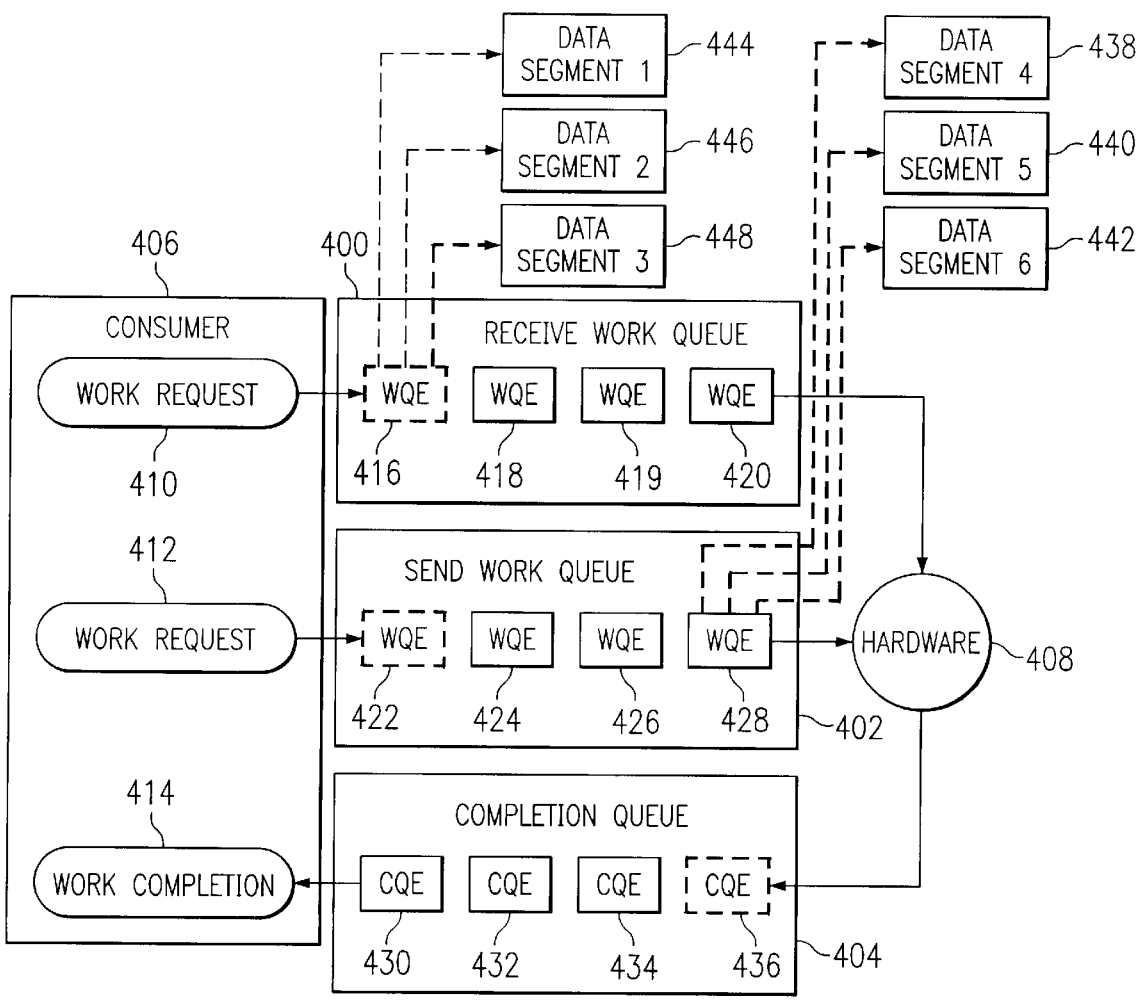
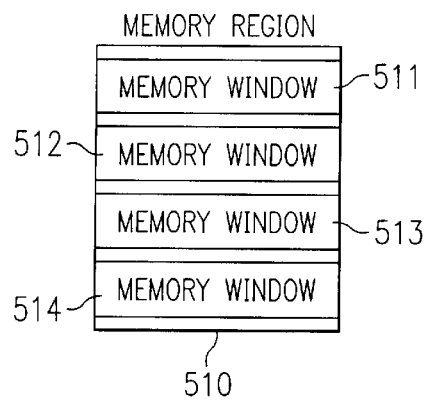

METHOD AND APPARATUS FOR ASSOCIATING MEMORY WINDOWS WITH MEMORY REGIONS IN A DATA STORAGE SYSTEM

BACKGROUND OF THE INVENTION

1. Technical Field

The present invention relates to memory access in computer systems, and more specifically, how to determine if Memory Windows are bound to a specific Memory Region.

2. Description of Related Art

In a System Area Network (SAN), the hardware provides a message passing mechanism which can be used for Input/Output devices (I/O) and interprocess communications between general computing nodes (IPC). Consumers access SAN message passing hardware by posting send/receive messages to send/receive work queues on a SAN channel adapter (CA). The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The channel interface (CI) interprets verbs and directly accesses the channel adapter.

A Memory Region is an area of memory that is contiguous in the virtual address space and for which the translated physical addresses and access rights have been registered with the HCA. A Memory Window is an area of memory within a previously defined Memory Region, for which the access rights are either the same as or a subset of those of the Memory Region.

SUMMARY OF THE INVENTION

The present invention provides a method, program and system for associating memory windows with memory regions in an infiniband data storage system. The invention comprises registering a Memory Region, wherein the Memory Region is a set of virtually contiguous memory addresses defined by a virtual address and length. The system then establishes and maintains a Window Reference Count (WRC) for the Memory Region, which tracks the number of Memory Windows which are bound to the Memory Region. When the system binds a Memory Window to the Memory Region, the value of the WRC is incremented. When a Memory Window is unbound from the Memory Region, the value of the WRC is decremented. If no Memory Windows are bound to the Memory Region, the value of the WRC is zero.

Before the Memory Region is deregistered, the WRC is checked to determine if any Memory Windows are bound to the Memory Region. If any Memory Windows are bound to the Region, the system will either invalidate the Windows and allow deregistration to proceed, or it will return an error and suspend deregistration until special code has performed all necessary unbinds of the Windows. Once the value of the WRC equals zero, the system deregisters the Memory Region.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a diagram illustrating processing of Work Requests in accordance with a preferred embodiment of the present invention;

FIG. 5 depicts a schematic diagram illustrating the relationship between Memory Windows and a Memory Region in accordance with the present invention;

DETAILED DESCRIPTION OF THE PREFERRED EMBODIMENT

The present invention provides a distributed computing system having end nodes, switches, routers, and links interconnecting these components. Each end node uses send and receive queue pairs to transmit and receive messages. The end nodes segment the message into packets and transmit the packets over the links. The switches and routers interconnect the end nodes and route the packets to the appropriate end node. The end nodes reassemble the packets into a message at the destination.

Figure 1:
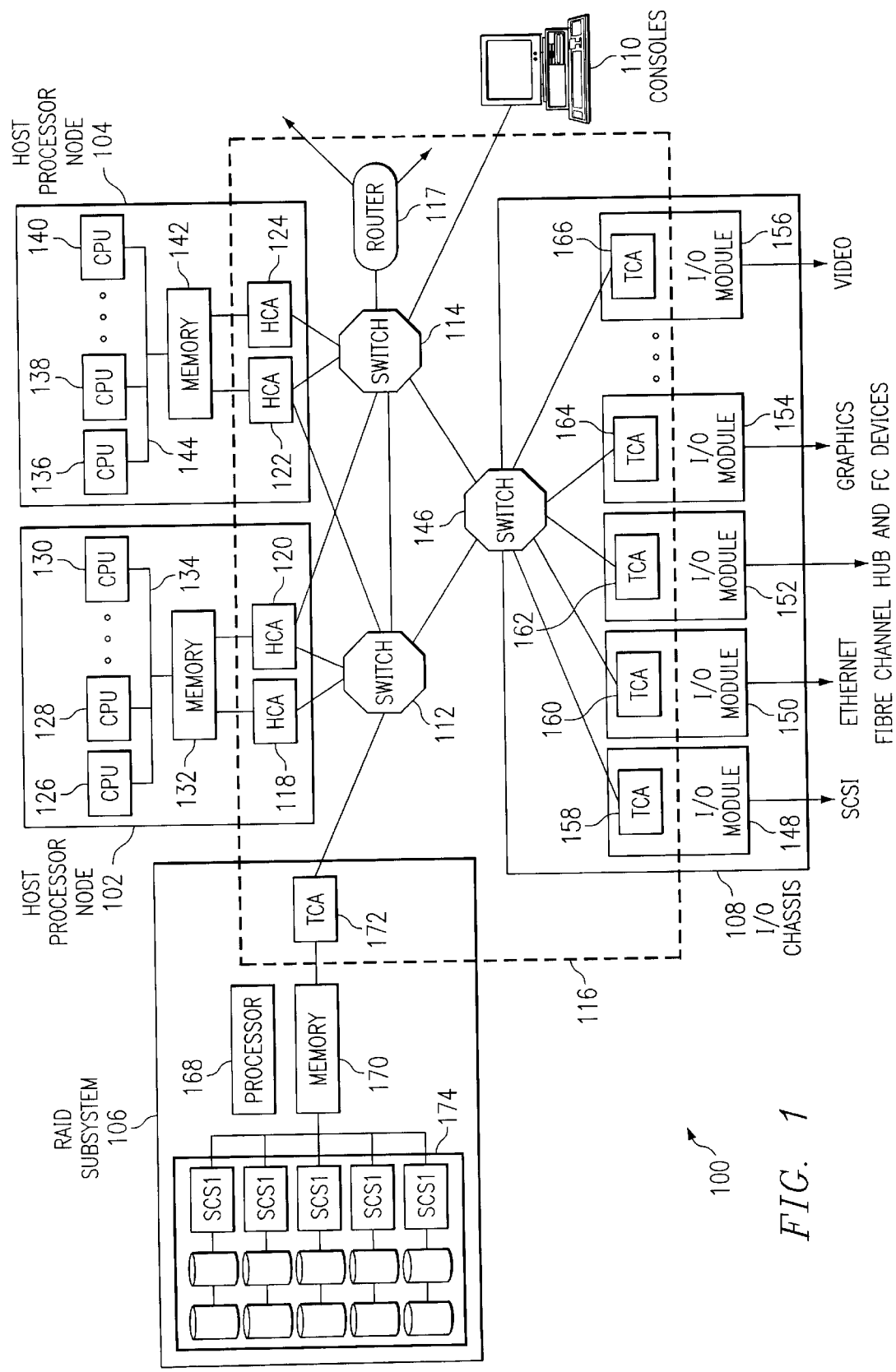
FIG. 1 depicts a diagram of a networked computing system in accordance with a preferred embodiment of the present invention.

With reference now to the figures and in particular with reference to FIG. 1, a diagram of a networked computing system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or packets in SAN 100.

In one embodiment of the present invention, an error handling mechanism in distributed computer systems is present in which the error handling mechanism allows for reliable connection or reliable datagram communication between end nodes in a distributed computing system, such as SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the packets through the SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing packets from one link in a first subnet to another link in a second subnet using a large header Destination Globally Unique Identifier (DGUID).

In one embodiment, a link is a full duplex channel between any two network fabric elements, such as endnodes, switches, or routers. Example of suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers.

The I/O chassis 108 in FIG. 1 include an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in a distributed computer system. With an I/O adapter attached to the SAN 100, the resulting I/O adapter node has substantially the same communication capability as any host processor node in SAN 100.

Figure 2:
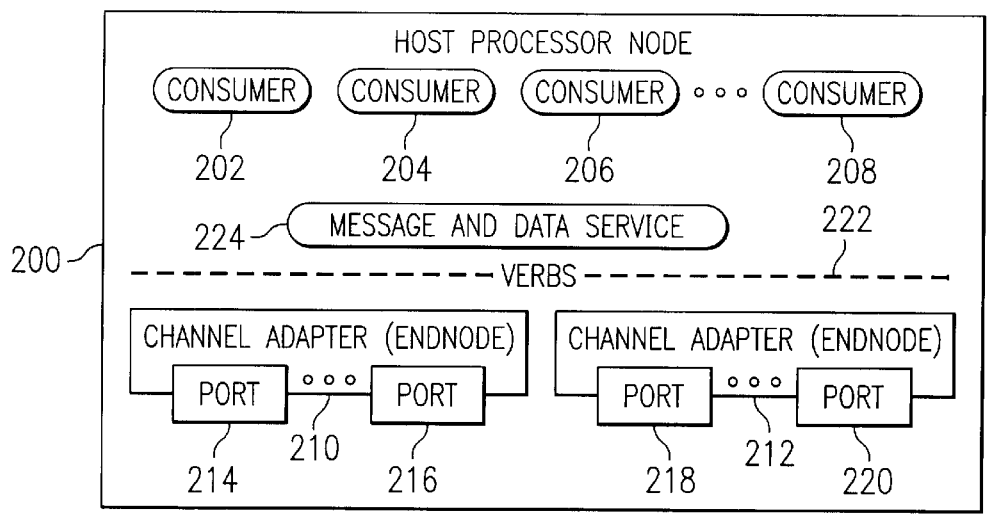
FIG. 2 depicts a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212. Message and data service 224 provides an interface to consumers 202–208 to process messages and other data.

Figure 3:
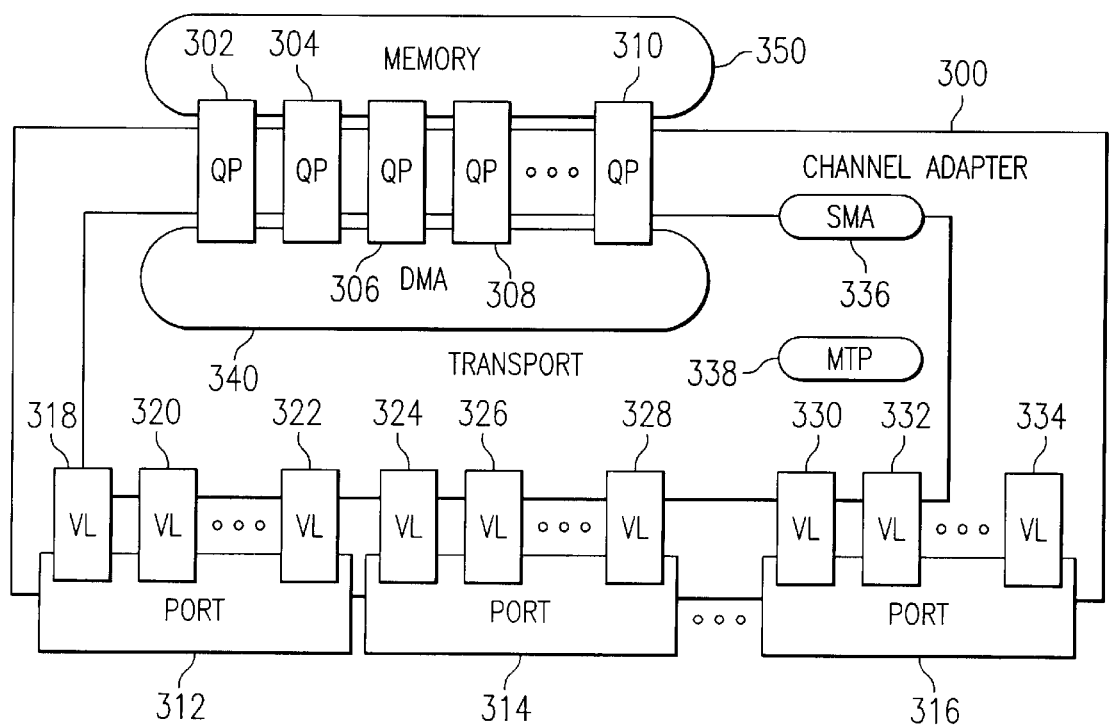
FIG. 3 depicts a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316. Buffering of data to host channel adapter ports 312–316 is channeled through virtual lanes (VL) 318–334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 350 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place Work Requests onto a Work Queue (WQ).

With reference now to FIG. 4, a diagram illustrating processing of Work Requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates Work Requests 410 and 412 and receives work completion 414. As shown in FIG. 4, Work Requests placed onto a work queue are referred to as Work Queue Elements (WQEs).

Send work queue 402 contains Work Queue Elements (WQEs) 422–428, describing data to be transmitted on the SAN fabric. Receive work queue 400 contains WQEs 416–420, describing where to place incoming channel semantic data from the SAN fabric. A WQE is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed Work Queue Elements. Completion queue 404 is used to create a single point of completion notification for multiple queue pairs. A completion queue element is a data structure on a completion queue. This element describes a completed WQE. The completion queue element contains sufficient information to determine the queue pair and specific WQE that completed. A completion queue context is a block of information that contains pointers to, length, and other information needed to manage the individual completion queues.

Example Work Requests supported for the send work queue 402 shown in FIG. 4 are as follows. A send Work Request is a channel semantic operation to push a set of local data segments to the data segments referenced by a remote node's receive WQE. For example, WQE 428 contains references to data segment 4 438, data segment 5 440, and data segment 6 442. Each of the send Work Request's data segments contains a virtually contiguous Memory Region. The virtual addresses used to reference the local data segments are in the address context of the process that created the local queue pair.

Referring to FIG. 5, a schematic diagram illustrating the relationship between Memory Windows and a Memory Region is depicted in accordance with the present invention. A Remote Direct Memory Access (RDMA) Read Work Request provides a memory semantic operation to read a virtually contiguous memory space on a remote node. A memory space can either be a portion of a Memory Region 510 or portion of a Memory Window, such as Windows 511–514. The Memory Region 510 references a previously registered set of virtually contiguous memory addresses defined by a virtual address and length. Memory Windows 511–514 reference sets of virtually contiguous memory addresses which have been bound to a previously registered Memory Region 510.

The present invention provides a method for associating Memory Windows with Memory Regions. A primary benefit of this approach is to help a user determine whether any Memory Windows are still bound to a Memory Region which is to be deregistered. Deregistering Memory Regions involves unpinning the memory associated with the Region and invalidating the address translation tables. If a Memory Window is still bound to the Region a consumer could potentially access the Memory Window. In addition, if the Region has been deregistered there would not be correct address translation and the consumers access could corrupt a different user's memory.

Figure 6:
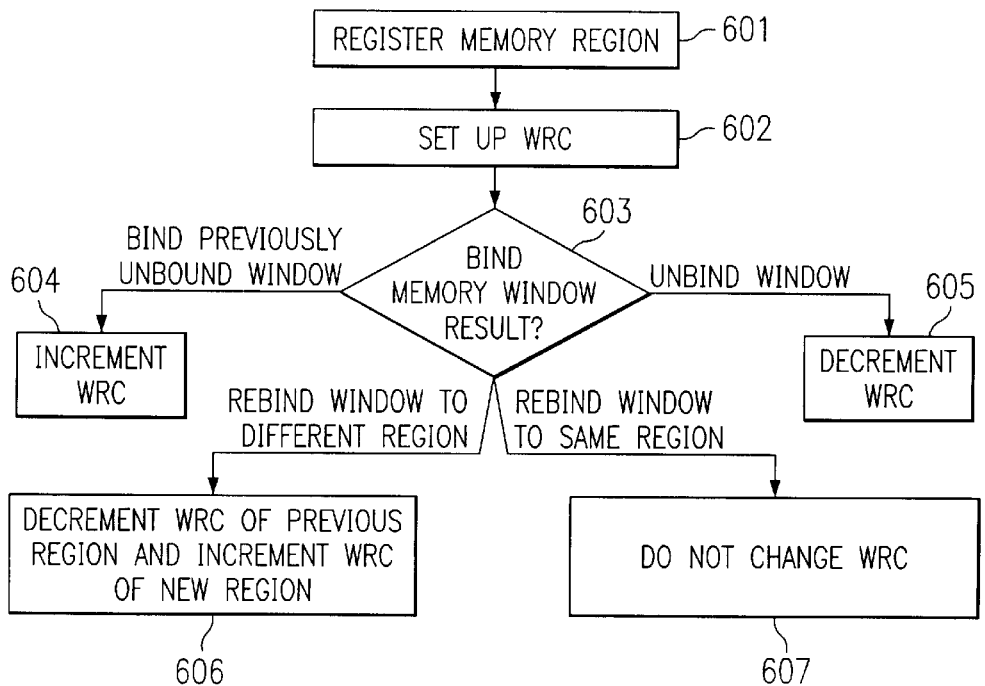
FIG. 6 depicts a flowchart illustrating the process for associating Memory Windows with a Memory Region in accordance with the present invention.

Referring now to FIG. 6, a flowchart illustrating the process for associating Memory Windows with a Memory Region is depicted in accordance with the present invention. When a Memory Region is registered with a HCA (step 601), Memory Windows may be bound or unbound to Memory Regions. To keep track of the Memory Windows bound to each Memory Region, the HCA sets up and maintains a Window Reference Count(WRC) for each Memory Region (step 602). Each time a previously unbound Memory Window is bound to a Memory Region, the HCA increments the WRC for that Memory Region (step 604). When a Memory Window is unbound from the Memory Region, the HCA decrements the WRC (step 605). If a Memory Window is unbound from one Memory Region and bound to a second Memory Region, the WRC for the previous Region is decremented, and the WRC for the new Region is incremented (step 606). If a Memory Window is rebound to the same Region, the WRC is not changed (step 607). A Memory Window is unbound from one Memory Region for implementations in which the consumer does not track the specific Memory Region to which a Memory Window was previously bound. Memory Windows are bound to and unbound from Memory Regions depending on the needs of the system. If no Memory Windows are bound to a particular Memory Region, the WRC for that Memory Region will have a value of zero.

Figure 7:
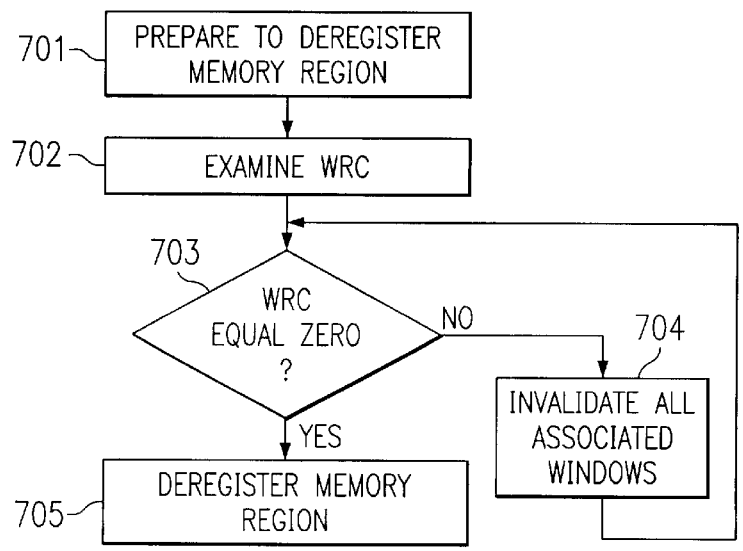
FIG. 7 depicts a flowchart illustrating the process of deregistering a Memory Region in accordance with the present invention.

Referring now to FIG. 7, a flowchart illustrating the process of deregistering a Memory Region is depicted in accordance with the present invention. After HCA software prepares to deregister a particular Memory Region (step 701), the software first examines the WRC associated with that Memory Region (step 702). The Memory Region cannot be deregistered until all Memory Windows are unbound from the Memory Region. As stated above, the Memory Windows must be unbound to prevent future access of the deregistered Memory Region, which could interfere with another user's memory. If the WRC has a value of zero, the HCA software can safely proceed with the deregistration of the Memory Region (step 705).

If the WRC value is not zero, an error has occurred since the action of deregistering a Memory Region is normally expected to be performed after software confirms that all Windows are already unbound from the Region to be deregistered. The HCA software should invalidate any Memory Windows which are still associated with the Memory Region being deregistered (step 704). This process entails reading each of the HCA Memory Window hardware facilities, and then writing those hardware facilities to an inactive state if they are found to be associated with the particular Memory Region in question. The Deregister Memory Region operation can then be complete successfully.

As an alternative to invalidating the bound Memory Windows, step 704 may comprise returning an error and preventing completion of deregistration, forcing the OS kernel clean-up code to walk the Window table and clean up by doing all of the necessary unbinds. Using either alternative in step 704, the HCA software can be assured that there are no Memory Windows associated with a Memory Region when that Memory Region is deregistered.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for associating memory windows with memory regions in a data storage system, the method comprising:

registering a memory region, wherein the memory region is a set of virtually contiguous memory addresses defined by a virtual address and length;

establishing a window reference count for the memory region, wherein the value of the window reference count corresponds to a plurality of memory windows bound to the memory region;

binding a first memory window to the memory region and incrementing the value of the window reference count;

binding a second memory window to the memory region and incrementing the value of the window reference count;

deregistering a memory region;

examining the window reference count;

unbinding any memory windows bound to the memory region, as determined by the value of the window reference count by;
  returning an error signal if the value of the window reference count is non-zero; and
  suspending deregistration of the memory region until an operating system kernel clean-up code has unbound all memory windows from the memory region; and deregistering the memory region only if the window reference count has a value of zero.

2. The method according to claim 1, further comprising:

unbinding a bound memory window from the memory region and decrementing the value of the window reference count.

3. A method for associating memory window with memory regions in a data storage system, the method comprising:

registering a memory region, wherein the memory region is a set of virtually contiguous memory addresses defined by a virtual address and length;

establishing a window reference count for the memory region, wherein the value of the window reference count corresponds to a plurality of memory windows bound to the memory region;

binding a first memory window to the memory region and incrementing the value of the window reference count;

binding a second memory window to the memory region and incrementing the value of the window reference point;

deregistering a memory region;

examining the window reference count;

unbinding any memory windows bound to the memory region, as determined by the value of the window reference count by:
returning an error signal if the value of the window registration count is non-zero; and
invalidating all bound memory windows and allowing memory region deregistration to proceed; and
deregistering the memory region only if the window reference count has a value of zero.

4. The method according to claim 3, further comprising the step of:
unbinding a bound memory window from the memory region and decrementing the value of the window reference count.

5. A computer program product in a computer readable medium for use in a data processing system, for associating memory windows with memory regions in a data storage system, the computer program product comprising:
instructions for registering a memory region, wherein the memory region is a set of virtually continuous memory addresses defined by a virtual address and length;
instructions for establishing a window reference count for the memory region, wherein the value of the window reference count corresponds to a plurality of memory windows bound to the memory region;
instructions for binding a first memory wine LOW to the memory region and incrementing the value of the window reference count;
instructions for binding a second memory window to the memory region and incrementing the value of the window reference count;
instructions for deregistering a memory region;
instructions for examining the window reference count;
instructions for unbinding any memory windows bound to the memory region, as determined by the value of the window reference count, said instructions for unbinding including:
instructions for returning an error signal if the value of the window reference count is non-zero; and
instructions for suspending deregistration of the memory region until an operating system kernel clean-up code has unbound all memory windows from the memory region; and
instructions for deregistering the memory region only if the window reference count has a value of zero.

6. The computer program product according to claim 5, further comprising:
instructions for unbinding a bound memory window from the memory region and decrementing the value of the window reference count.

7. A computer program product in a computer readable medium for use in a data processing system, for associating memory windows with memory regions in a data storage system, the computer program product comprising:
instructions for registering a memory region, wherein the memory region is a set of virtually contiguous memory addresses defined by a virtual address and length;
instructions for establishing a window reference count for the memory region, wherein the value of the window reference count corresponds to a plurality of memory windows bound to the memory region;
instructions for binding a first memory window to the memory region and incrementing the value of the window reference count;
instructions for binding a second memory window to the memory region and incrementing the value of the window reference count;
instructions for deregistering a memory region;
instructions for examining the window reference count;
instructions for unbinding any memory windows bound to the memory region, as determined by the value of the window reference count, said instructions for unbinding including:
instructions for returning an error signal if the value of the window reference count is non-zero; and
instructions for invalidating oil bound memory windows and allowing memory region deregistration to proceed; and
instructions for deregistering the memory region only if the window reference count has a value of zero.

8. The product according to claim 7, further comprising:
instructions for unbinding a bound memory window from the memory region and decrementing the value of the window reference count.

9. An apparatus for associating memory windows with memory regions in a data storage system, the apparatus comprising:
a first register which registers a memory region, wherein the memory region is a set of virtually contiguous memory addresses defined by a virtual address and length;
a second register which maintains a window reference count for the memory region, wherein the value of the window reference count corresponds to a plurality of memory windows bound to the memory region;
a first binding component which binds a first memory window to the memory region and increments the value of the window reference count;
a second binding component which binds a second memory window to the memory region and increments the value of the window reference count;
a first deregistration component which deregisters a memory region;
an examining component which examines the window reference count;
an unbinding component which unbinds any memory windows bound to the memory region, said unbinding component comprising:
a response component which returns an error signal; and
a regulating component which suspends deregistration of the memory region until an operating system kernel clean-up code has unbound all memory windows from the memory region; and
a second deregistration component which deregisters the memory region only if the window reference count has a value of zero.

10. The apparatus according to claim 9, further comprising:
an unbinding component which unbinds a bound memory window from the memory region and decrements time value of the window reference count.

11. An apparatus for associating memory windows with memory regions in a data storage system, the apparatus comprising:
a first register which registers a memory region, wherein the memory region is a set of virtually contiguous memory addresses defined by a virtual address and length;
a second register which maintains a window reference count for the memory region, wherein the value of the window reference count corresponds to a plurality of memory windows bound to the memory region;

a first binding component which binds a first memory window to the memory region and increments the value of the window reference count;

a second binding component which binds a second memory window to the memory region and increments the value of the window reference count;

a first deregistration component which deregisters a memory region;

an examining component which examines the window reference count;

an unbinding component which unbinds any memory windows bound to the memory region, said unbinding component comprising:

a response component which returns an error signal; and an invalidation component which invalidates all bound memory windows and allowing memory region deregistration to proceed; and a second registration component which deregisters the memory region only if the window reference count has a value of zero.

12. The apparatus according to claim 11, further comprising:

an unbinding component which unbinds a bound memory window from the memory region and decrements the value of the window reference count.

* * * * *